United States Patent
Chung

(10) Patent No.: US 7,329,202 B2
(45) Date of Patent: Feb. 12, 2008

(54) TOOTHLESS GEAR SPEED REDUCER

(76) Inventor: Hung-Chun Chung, No 4, Lane 130, Nan-Kang Rd, Sec. 3, Taipei (TW)

(*) Notice: Subject to any disclaimer, the term of this patent is extended or adjusted under 35 U.S.C. 154(b) by 205 days.

(21) Appl. No.: 11/252,694

(22) Filed: Oct. 17, 2005

(65) Prior Publication Data

US 2007/0084304 A1   Apr. 19, 2007

(51) Int. Cl.
  *F16H 1/32*   (2006.01)
  *F16H 15/48*  (2006.01)
  *F16H 3/22*   (2006.01)
(52) U.S. Cl. .................. 475/180; 475/193; 74/348
(58) Field of Classification Search ............... 74/393, 74/348, 349; 475/335, 180, 193, 182; 180/65.5, 180/65.7
See application file for complete search history.

(56) References Cited

U.S. PATENT DOCUMENTS

| 1,618,301 | A | * | 2/1927 | McClintock | 475/187 |
| 1,737,295 | A | * | 11/1929 | Bronander | 475/187 |
| 1,871,835 | A | * | 8/1932 | Batchelder | 475/183 |
| 2,255,200 | A | * | 9/1941 | Wahl | 475/185 |
| 2,974,547 | A | * | 3/1961 | Egan | 475/189 |
| 6,974,399 | B2 | * | 12/2005 | Lo | 475/5 |

\* cited by examiner

*Primary Examiner*—Tisha Lewis
(74) *Attorney, Agent, or Firm*—Pro-Techtor Int'l Services

(57) ABSTRACT

A toothless gear speed reducer, which mainly includes an inclined plane cone drive gear, inclined plane conical driven gears and an inclined plane outer gear case drive ring. The toothless gear speed reducer overcomes the difficult problems existent in conventional speed reducers to decrease dimensions and minimize abrasion, and achieves reducing manufacturing time, thereby providing higher efficiency and saving on manufacturing cost.

3 Claims, 2 Drawing Sheets

TOOTHLESS GEAR SPEED REDUCER

BACKGROUND OF THE INVENTION (a) Field of the Invention

The present invention relates to a toothless gear speed reducer, which uses contact forces between inclined planes to achieve a superior driving force that minimizes abrasion and decreases dimensions of the speed reducer.

(b) Description of the Prior Art

FIG. 1 shows a conventional speed reducer structured to include a gear set mechanism of large and small gears, which engage to achieve a deceleration objective. However, because of the relatively large friction in the gear set, thus, a large quantity of lubricating oil is usually needed to lubricate the speed reducer. Furthermore, the gears must be increased in size in order to achieve a larger driving force, which correspondingly increases the dimensions of the reducer, and thus is unable to achieve the objective of miniaturization.

SUMMARY OF THE INVENTION

The present invention is applicable for use in a variety of toothless gear speed reducers, and utilizes contact forces between conical inclined planes to achieve objectives of producing a superior driving force and minimization of abrasion.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
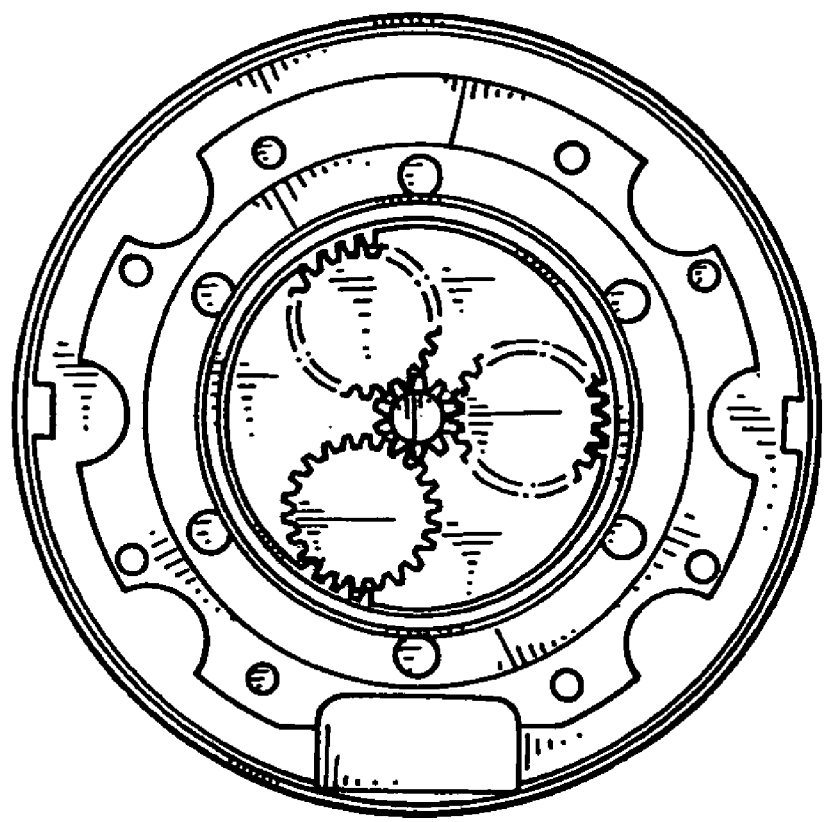
FIG. 1 shows a conventional gear-driven speed reducer.
Figure 2:
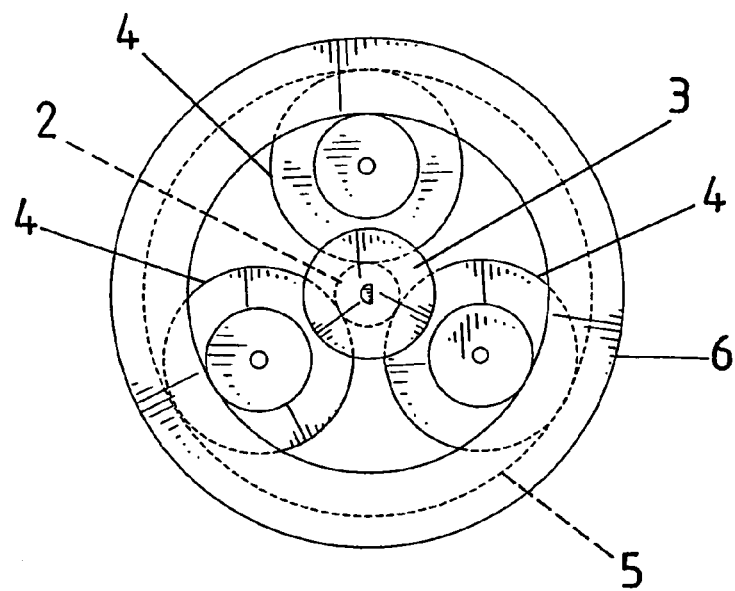
FIG. 2 shows a top view of an embodiment according to the present invention.
Figure 3:
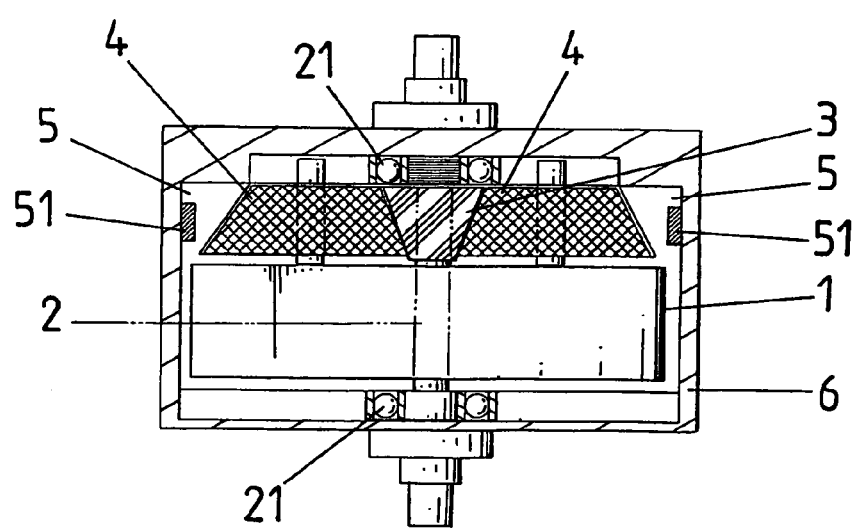
FIG. 3 shows a side view of the embodiment according to the present invention.

Referring to FIGS. 2 and 3, which show the toothless gear speed reducer of the present invention structured with a fixed mounting shaft, and comprising component members including an electric motor 1 having a drive shaft 2, a planar planetary gear drive with an inclined plane conical drive gear 3 mounted to, or formed on, the drive shaft a plurality of conical deceleration driven gears 4 having an output gear speed substantially equal to the input gear speed, an inclined plane outer gear case drive ring 5 and an outer gear case 6. The drive shaft 2 at a center of the electric motor 1 drives and rotates the inclined plane cone drive gear 3. A bearing 21 is disposed on an upper end and a lower end of the fixed shaft 2. The inclined plane outer gear case drive ring 5 drives and rotates the outer gear case 6. Unidirectional or bidirectional fixing blocks 51 are configured on the inclined plane outer gear case drive ring 5. The toothless gear speed reducer of the present invention is characterized in that:

The inclined plane conical drive gear 3 and the plurality of conical deceleration driven gears 4 each have toothless structures, and the present invention uses contact forces between conical inclined planes to achieve the objectives of producing a superior driving force and minimization of abrasion. A drive end of the speed reducer of the present invention achieves superior transmission without slippage through the inverted conical inclined planes engaging with a conical inclined plane shaft, which further actuate peripheral rotation of an inner conical inclined plane. The present invention is a single layer deceleration structure, but further sets of inclined plane cone drive gears and conical deceleration driven gears can be also superimposed on the original deceleration structure as an additional layer, thereby forming a double layer speed reducer that multiplies deceleration efficiency. A multilayered speed reducer can also be formed using the same structural principle, thereby increasing deceleration efficiency N-fold.

In conclusion, the present invention uses contact forces between conical inclined planes to achieve the objectives of producing superior driving force and minimization of abrasion.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A toothless gear speed reducer, comprising
   an electric motor having a drive shaft supported by bearings configured on an upper end and on a lower end;
   at least one planar planetary gear train further comprising
   an inclined plane conical drive gear attached to, or formed of, the drive shaft of the motor;
   a plurality of conical deceleration driven gears driven on the exterior inclined surface by the inclined exterior surface of the drive gear, and having an output gear surface speed substantially equal to the input gear surface speed;
   an inclined plane outer gear case drive ring; and
   an outer gear case connected to the drive ring;
   wherein the drive shaft at a center of the electric motor drives and rotates the inclined plane cone drive gear, the inclined plane outer gear case drive ring drives and rotates the outer gear case, and contact forces between conical inclined planes are used to achieve a superior driving force.

2. The toothless gear speed reducer according to claim 1, wherein unidirectional or bidirectional fixing blocks are configured between the inclined plane drive ring and the outer gear case.

3. The toothless gear speed reducer according to claim 1, wherein the inclined plane cone drive gear and the plurality of conical deceleration driven gears are one layer or multi-layer multiple deceleration structures.

* * * * *